United States Patent [19]

Sunderhaus

[11] Patent Number: 5,695,221
[45] Date of Patent: Dec. 9, 1997

[54] FUEL HOSE BREAKAWAY UNITS

[75] Inventor: Charles A. Sunderhaus, Hamilton, Ohio

[73] Assignee: Dover Corporation, New York, N.Y.

[21] Appl. No.: 535,589

[22] Filed: Oct. 2, 1995

[51] Int. Cl.⁶ ............................................. F16L 35/00
[52] U.S. Cl. .................... 285/1; 285/45; 285/304; 285/318; 285/321; 285/330; 251/149.7
[58] Field of Search ............... 285/1, 45, 304, 285/318, 321, 330, 92, 373, 419, 319, 906, 921, 922; 251/147.7

[56] References Cited

U.S. PATENT DOCUMENTS

| | | | |
|---|---|---|---|
| 771,709 | 10/1904 | Carney | 285/419 X |
| 3,152,815 | 10/1964 | Barragato et al. | 285/1 |
| 3,435,848 | 4/1969 | Johnston | 285/1 X |
| 3,454,047 | 7/1969 | Johnston | 285/1 X |
| 4,093,280 | 6/1978 | Yoshizawa et al. | 285/330 X |
| 4,363,337 | 12/1982 | Pease | 285/330 X |
| 5,000,491 | 3/1991 | Bartholomew | 285/318 X |
| 5,135,029 | 8/1992 | Anderson et al. | 285/1 X |
| 5,388,866 | 2/1995 | Schlosser | 285/92 |
| 5,454,602 | 10/1995 | Anderson et al. | 285/1 |

FOREIGN PATENT DOCUMENTS

331604  7/1930  United Kingdom ............. 285/304

*Primary Examiner*—Dave W. Arola
*Attorney, Agent, or Firm*—Kinney & Schenk

[57] ABSTRACT

A fuel hose breakaway unit comprising couplers that are held in assembled relation by longitudinally extending fingers that are mounted on the outlet coupler and engage abutment lugs on the inlet coupler. When a predetermined longitudinal separation force is applied to the couplers, the fingers flex outwardly to a release position, permitting the couplers to separate. The fingers are provided by finger sets, each of which is provided with three fingers. A locking collar locks the bases of the finger sets onto the outer surface of the housing for the outlet coupler.

7 Claims, 6 Drawing Sheets

FUEL HOSE BREAKAWAY UNITS

The present invention relates to breakaway units employed in hoses connecting fuel nozzles to the pedestals of fuel dispensing units. The purpose and function of breakaway units is to minimize, if not prevent, damage and the creation of a hazard in the event a vehicle drives away with a dispensing nozzle in its fuel tank fill pipe. More particularly the invention relates to improvements in breakaway units for coaxial hoses employed in vapor recovery fuel dispensing systems where fuel vapors are returned to a storage tank in order to minimize air pollution.

While infrequent, there are occasions when a vehicle is driven away from a fuel dispenser without removing the dispensing nozzle from the fill pipe of the vehicle's fuel tank. It is also possible for a fuel hose to otherwise become caught on a vehicle so that, when the vehicle is driven away, the hose exerts a force on the pedestal of the dispensing unit that can cause it to topple and be pulled from the base on which it is mounted. Such an occurrence, known in the trade as a "drive away", creates the potential for a serious fire hazard, as well as causing damage to the nozzle, fuel hose and the dispenser itself.

In U.S. Pat. No. 5,135,029, which is of common assignment with the present application, there are several proposals for the provision of breakaway units that are particularly suited to protecting against a dispenser pedestal being toppled in the event a vehicle is driven away with a fuel nozzle lodged in the fill pipe of the vehicle's fuel tank. The present invention pertains to a releasable locking mechanism, disclosed in the U.S. Pat. No. 5,135,029, which employs longitudinally extending fingers, mounted on one coupler of a coupling. These fingers are engageable with fixed abutments on the other coupler of the coupling. When an axial loading of a predetermined force, indicative of a driveaway vehicle, is exerted on the coupling, the fingers flex outwardly to a release position in which the couplers separate.

It is important, if not critical, that the force at which separation occurs being accurately controlled so that separation occurs as closely as possible to, but still at a force which will not cause the pedestal to topple. This brings into focus the fact that when the main poppet of a nozzle is closed, there can be a "water hammer" affect that creates a separation force on the couplers. Under appropriate conditions, this "water hammer" force can approach the force at which a pedestal can be toppled. This is particularly true with respect to so called "high hose" dispensers, where the hoses are attached to the pedestal at a height of ten feet or more from the base of the pedestal. It thus becomes necessary to set the force at which separation occurs at a level high enough to prevent unwanted, nuisance separation as a result of "water hammer" forces, while still maintaining the separation force at a level below that at which a pedestal can be toppled.

The end of attaining accuracy in the force at which separation occurs is economically attained, in the referenced patent, by forming the fingers of a plastic material (synthetic resin). The major force opposing displacement of the plastic fingers to release positions is provided by a spring steel, garter spring, or garter springs. The stiffness of plastic fingers provides only a small portion of the force opposing flexing of the fingers. As is further developed in the referenced patent, this arrangement has been found highly effective in obtaining separation of couplers within a relatively narrow range of separation forces so that there is essentially no nuisance separation because of "water hammer" force at the same time separation is reliably obtained before the hose forces reach a level sufficient to topple the dispenser pedestal.

In the referenced patent, the breakaway unit is adapted for use in vapor recovery systems, wherein the hose, in addition to the usual fuel passage, also has a vapor passage for return of vapors, displaced from the vehicle tank, back to the storage tank from which the fuel is being supplied. In the referenced patent, the fuel hose comprises what is now referenced as a "standard" coaxial fuel hose, in which fuel flow through a central tube and an annular, vapor return passage is defined by an outer tube surrounding the fuel carrying tube.

The breakaway unit couplers are also provided with valves in the fuel passage of each coupler, that automatically close when the couplers are separated. Thus, in the event of a "driveaway", spilling of fuel is greatly minimized, if not essentially prevented.

Relatively recently, the use of "inverted" coaxial hoses has become an accepted practice in vapor recovery systems. "Inverted" coaxial hoses reverse the functions of the two passages so that the central passage is the vapor return passage and the annular passage is the fuel passage.

The primary object of the present invention of the invention is improve the fingers employed in releasably connecting couplers of the referenced type.

A more specific object of the invention is to provide a finger construction and mounting arrangement that facilitates assembly of the fingers into a coupler construction.

A further object of the invention is to accomplish the foregoing ends in a coupler construction adapted for use with an "inverted" coaxial hose.

The foregoing ends may be broadly attained by a fuel hose breakaway unit adapted to be connected in series flow relation with a hose and a fuel dispensing nozzle to minimize, if not fully prevent, damage in the event a vehicle is driven away with the nozzle lodged in the vehicle's fuel tank or there is, otherwise, a connection between the hose and the driveaway vehicle. The breakaway unit comprises an inlet coupler, an outlet coupler, and locking mechanism releasably connecting said couplers in assembled relation. The locking mechanism comprises abutment surface portions disposed on one coupler. A plurality of fingers is mounted on the other coupler. The fingers have free ends that are releasably engageable with the abutment surface portions of the other coupler to releasably connect the couplers.

This breakaway unit is characterized in that the fingers are formed as portions of two finger sets. Each of these finger sets comprises a semi-circular band and a plurality of fingers integrally formed with and extending longitudinally from the semi-circular band.

The ends of the invention may be further attained by the provision of a locking collar for mounting the finger sets on the housing of one of the couplers, preferably the outlet coupler.

The above and other related objects and features of the invention will be apparent from a reading of the following description of the disclosure found in the accompanying drawings and the novelty thereof pointed out in the appended claims.

Figure 1:
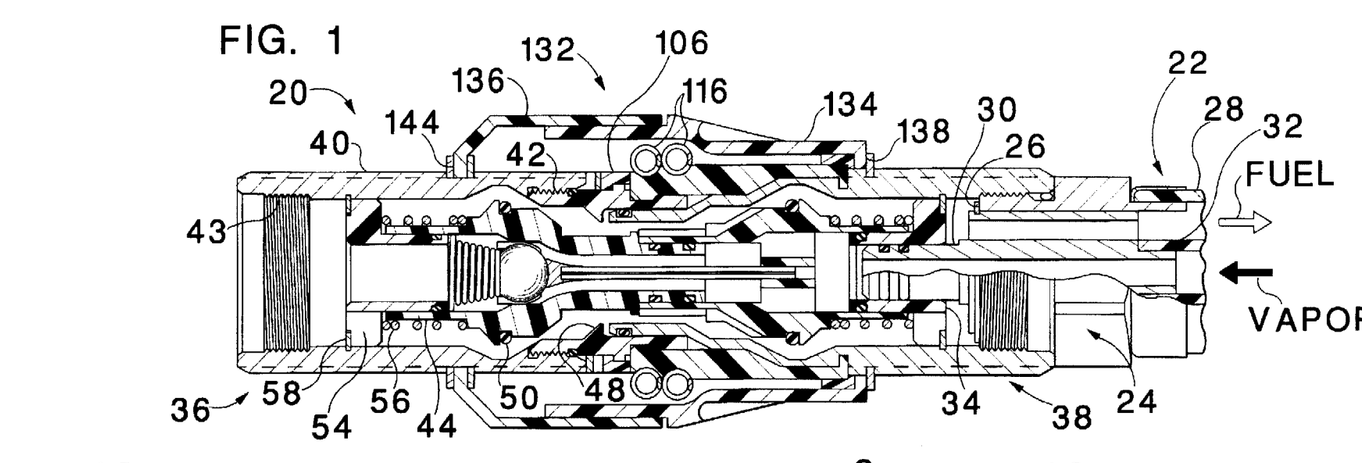
FIG. 1 is a longitudinal section of a breakaway unit coupling embodying the present invention.

A preferred embodiment of the breakaway coupling of the present invention is illustrated in FIG. 1 and identified by reference character 20. The use and function of breakaway couplings is more fully described in the aforereferenced U.S. Pat. No. 5,135,029 which, in summarization, sets forth that breakaway couplings are provided in the hose connection between the fixed pedestal of a fuel dispenser and a nozzle which is employed to deliver fuel into the fuel tank of a vehicle. If a vehicle drives away from a filling station with the nozzle inserted into the vehicle's fuel tank, the coupling separates at a predetermined axial loading. This separation prevents the hose from exerting a loading (force) sufficient to topple the pedestal in the event a driveway occurs.

A characterizing feature of the referenced, earlier breakaway couplings is that they provide this safety function in fuel delivery systems which have a vapor recovery capability. This is to point out that those breakaway couplings were adapted for use with hoses that contained both a fuel delivery passage and a vapor return passage. In providing the vapor recovery function, a nozzle would have means for capturing fuel vapors displaced from a vehicle's fuel tank, by fuel being discharged therein. The captured vapors are then transmitted through the vapor passage of the hose, back to the pedestal and, in most cases, then back to the fuel storage tank from which fuel is being delivered. The referenced couplings provide both a fuel passage and a vapor passage to accommodate the vapor recovery feature.

The breakaway coupling 20 differs from the breakaway couplings in the referenced patent in that it is adapted for use with inverted coaxial hoses. The breakaway couplings of the U.S. Pat. No. 5,135,029 are adapted for use with "standard" coaxial hoses. The term coaxial hose denotes a hose comprised of two flexible tubes, one disposed inside the other. The inner or central tube defines one fluid passage. The outer surface of the inner tube and the inner surface of the outer tube define an annular, second fluid passage. When coaxial hoses originally came into use in vapor recovery fuel systems, the central passage was the fuel passage and the annular passage was the vapor passage. More recently, it has become a preferred practice to employ "inverted" coaxial hoses, wherein the central passage is the vapor passage and the outer, annular passage is the fuel passage. The original version where the central passage is the fuel passage and the annular passage is the vapor passage, is now referenced as a "standard" coaxial hose.

As with "standard" coaxial hoses, "inverted" coaxial hoses are provided with a standardized adapters which are adapted to be received by appropriate fittings in connecting the respective fuel and vapor passages of the hose to fuel and vapor passages in a nozzle, at the connection to a pedestal. The coupling 20 is adapted for connection, at its opposite ends, with the standardized adapter of an "inverted" hose. The connection of an inverted hose section 22 to the outlet end of the coupling 20 is illustrated in FIG. 1.

The hose 22 has a fitting 24 comprised of an outer tubular piece 26 on which an outer flexible tube 28 is mounted. The fitting 24 also includes an inner tubular piece 30 on which an inner flexible tube 32 is mounted. The inner tubular piece 30 and the inner flexible tube define a central, vapor passage. The outer tubular piece 26 and the outer flexible tube 28 combine to define an annular fuel passage surrounding the vapor passage. The tubular pieces of the fitting 26 are interconnected so that the outer tubular piece 26 may be threaded into the outlet end of the coupling to mount it on the inverted hose section 22. As the outer tubular piece 26 is threaded into threads 33 on the coupler, the inner tubular piece is advanced into or further advanced into a central bore of a poppet support 34, the function of which will be described shortly.

Figure 2:
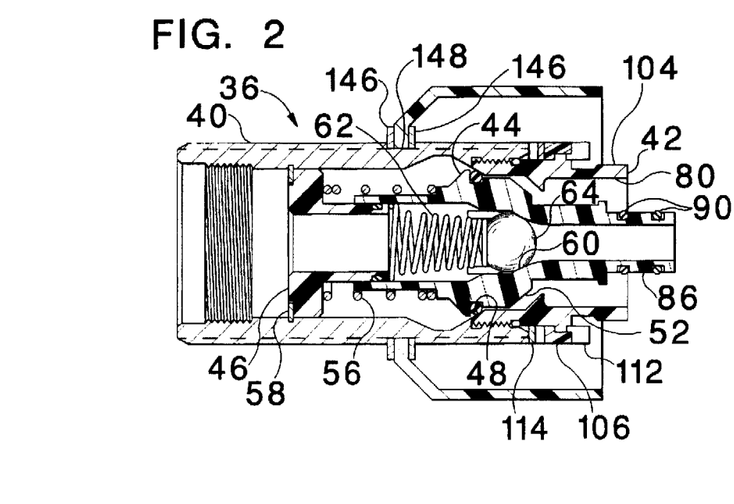
FIG. 2 is a longitudinal section of an inlet coupler, seen in FIG. 1, in its disassembled condition.
Figure 3:
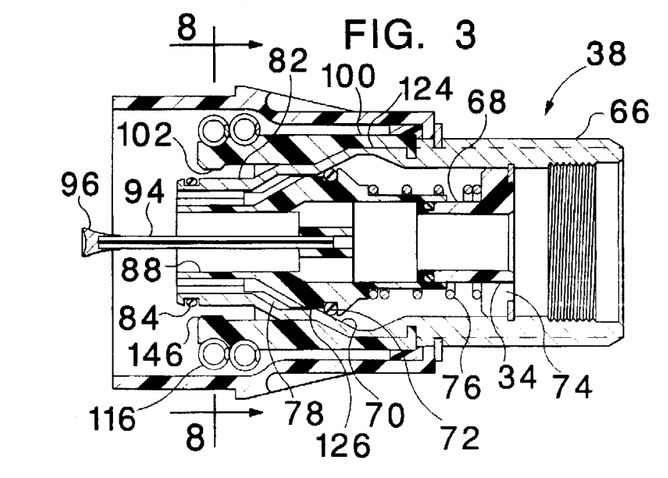
FIG. 3 is a longitudinal section of an outlet coupler, seen in FIG. 1, in its disassembled condition.
Figure 4:
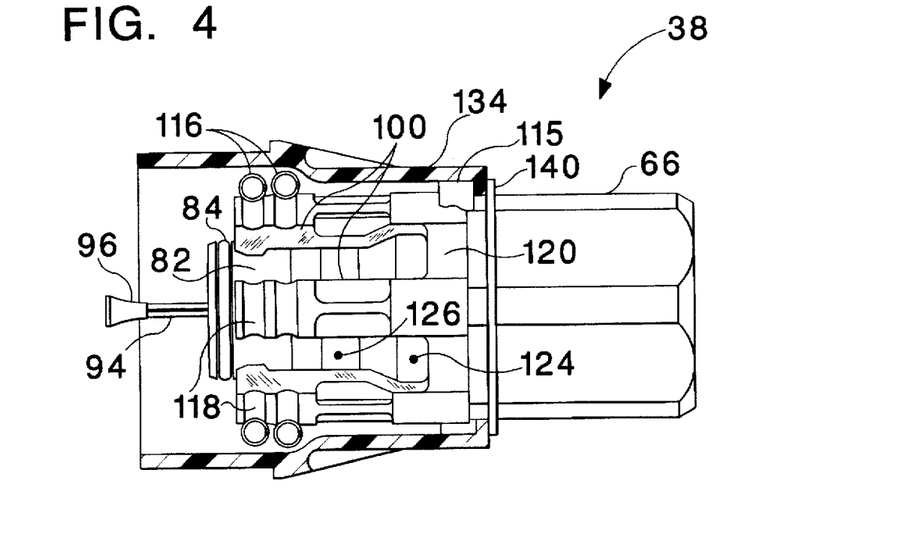
FIG. 4 is an elevation of the outlet coupler, seen in FIG. 3, with only an outer cover and locking collar in longitudinal section.

The coupling 20 comprises an inlet coupler 36 and an outlet coupler which are normally joined as illustrated in FIG. 1 and which are separately shown, respectively, in FIGS. 2 and 3.

The inlet coupler 36 (see also FIG. 2) comprises a compositely formed, outer, tubular housing formed by a primary tubular member 40 and a secondary tubular member 42, threadably mounted thereon. Internal threads 43 are provided at the inlet end of the primary housing member 40 to enable mounting of the adapter of an inverted coaxial hose, in the same fashion as described with the mounting of an inverted hose on the outlet end of the outlet coupler 38. The coaxial hose connection to the inlet coupler goes to the dispenser pedestal and a source of pressurized fuel that is in communication with the annular passage of the hose. The inner, vapor passage of the hose connected to the inlet coupler 36, may connect with counduit means, at the pedestal, that extend to the storage tank from which fuel is being dispensed. The coaxial hose connection with the outlet coupler 38 goes to the fuel nozzle and places the central passage of the hose and coupler in communication with the vapor collecting means of the nozzle, while placing the annular passage of the coupler 38 and hose in communication with the fuel passages of the nozzle, for discharge from the nozzles spout.

An inlet, fuel poppet 44, in the form of an elongated tubular member, is slidable mounted on a poppet support 46, at the inlet end of the primary housing 40. The poppet support 46 comprises a central tubular section, which, in combination with the inner surface of the poppet 44, defines a central vapor flow path through the inlet coupler 36. The outer surfaces of the tubular portion of the support 46 and the poppet 44, in combination with the inner surfaces of the outer housings 40, 42, define an annular, fuel flow path through the inlet coupler.

The inner surface of the housing member 42 has a conical valve seat 48 which is engaged by an O-ring 50 to seal the fuel flow passage through the inlet coupler. The poppet 44 has longitudinal ribs 52 which assist in maintaining the poppet centrally of the outer. The tubular portion of the poppet support 46 is centrally positioned relative to the outer housing 40 by radially extending vanes 54, which span the fuel passage of the coupler. A spring 56 disposed between the vanes 54 and the fuel poppet 44 yieldingly urge the poppet to a closed position in which the O-ring 50 engages the valve seat 48. A snap ring 58 maintains the poppet support 46, poppet 44 and spring 56 in assembled relation. The fuel poppet is thus closed when the inlet coupler 36 is separated from the outlet coupler 38.

The poppet 44 is provided with a conical seat 60 on its inner, vapor passage defining surface. A spring 62, engaged with the end of the support 46, urges a ball 64 into sealing engagement with the seat 60 so that the vapor passage of the inlet coupler is also closed when the inlet coupler 36 is separated from the outlet coupler 38. Appropriate rib means may be employed to maintain the ball 64 centrally of the vapor passage.

The outlet coupler 38, similarly, has an annular fuel passage and a central vapor passage. Thus, the outlet coupler 38 has a tubular housing 66, a centrally disposed tubular fuel poppet 68 and the previously referenced poppet support 34, on which the poppet 68 is slidably mounted. The tubular poppet 68 and the tubular portion of the poppet support 34 define a central vapor passage. The outer surfaces of the poppet 68 and the tubular portion of the support 34, in combination with the inner surface of the housing 66, define an annular fuel passage.

The inner surface of the housing 66 is provided with a conical seat 70, that is engaged by an O-ring 72 to close the fuel passage through the outlet coupler. The poppet support 34 is centrally positioned relative to the housing 66 by radial vanes 74. A spring 76, acting against the vanes 74, yieldingly urges the poppet 68 to a closed position. Longitudinal ribs 78 assist in maintaining the poppet 68 centrally of the housing 66. The fuel passage of the outlet poppet 38 is thus automatically closed whenever it is separated from the inlet coupler 36.

When the inlet coupler 36 and the outlet coupler 38 are joined, in assembled relation (FIG. 1) the respective fuel passages and vapor passages of each are aligned and sealingly joined, with the vapor valve 64 and poppets 44, 68 open for the flow of fuel and vapors to and from the nozzle that would be attached to the hose 22.

To achieve this assembled relation, it will be noted that the inlet housing member 42, at its mating end, is provided with a bore 80 that is adapted to slidingly receive, with a minimal clearance, the opposed, mating end portion 82 of the outlet housing 66. An O-ring 84 provides a positive seal of the outer bounds of the fuel passage at this juncture.

The mating end portion of the inlet poppet 44 is provided with a diameter 86 that is slidingly received, with a minimal clearance, by a bore 88 formed in the mating end portion of the outlet poppet 68. O-rings 90 provide a positive seal between the fuel and vapor passages at this juncture. It will also be noted that the fuel passage is positively sealed from the vapor passage at the sliding connection between the poppets 44, 68 and their respective poppet supports, by the illustrated O-rings.

In telescoping the inlet coupler 36 and the outlet coupler 38 into assembled relation, a sealed connection is first established between the outer housings, by end portion 82 entering bore 80 and then a sealed connection is established between the two poppets 44, 68. Continued telescoping movement then displaces the poppets 44, 68 to open positions axially spaced from the respective seats 48, 70.

It will also be noted that the outlet coupler 38 has central spider 92 and that a rod 94 projects therefrom, centrally of the vapor passage, towards the mating end of the coupler. The rod 94 may, conveniently, be in the form of a rolled pin. During the final portion of the movement telescoping the couplers into assembled relation, the vapor passage valve ball 64 is engaged by a rod end 96 which maintains the ball in an open position.

The present invention goes to the means for releasably maintaining the couplers 36, 38 in assembled relation and releasing said couplers for separation when a predetermined load has been exerted on the hose, indicative of a vehicle driving away from a fuel dispenser, with the dispensing nozzle still lodged in the vehicle's fuel tank.

These means comprise a plurality of fingers 100, which are anchored on the outlet coupler housing 66 and project into longitudinally coextensive, outwardly spaced relation from the diameter 82, that mates with the bore 80 of the inlet coupler. From a practical standpoint it has been found that six fingers 100 provide the necessary connecting/release function in an economical fashion. The preferred material for forming the fingers is a synthetic resin having resilient, flexible properties. A suitable material is an acetal resin.

Figure 9:
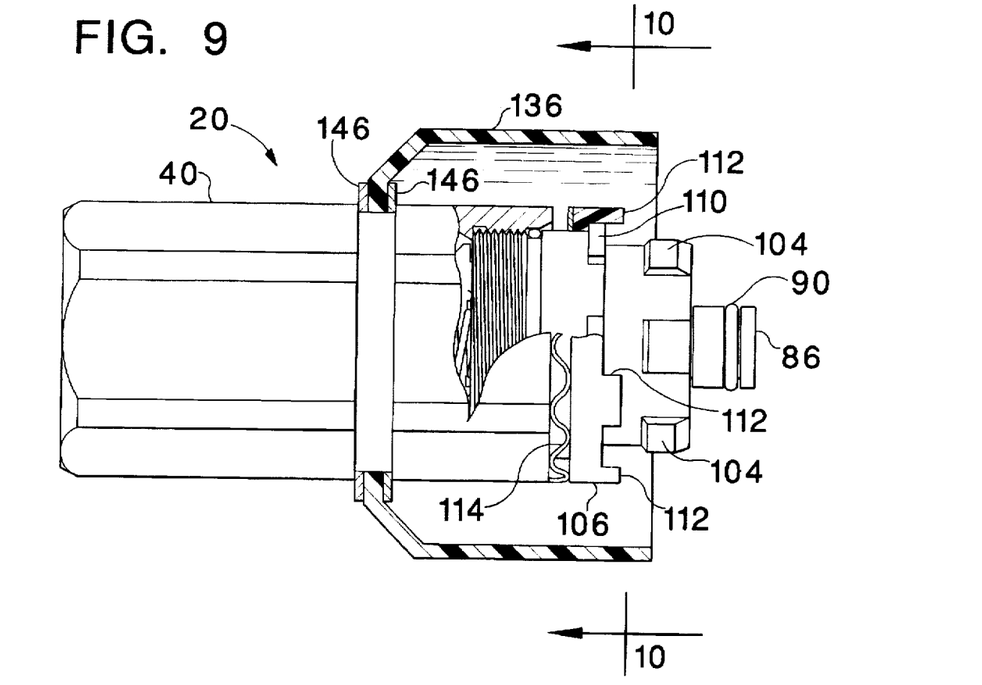
FIG. 9 is a an elevation of the inlet coupler, as seen in FIG. 2, with interlock components illustrated in further detail.
Figure 10:
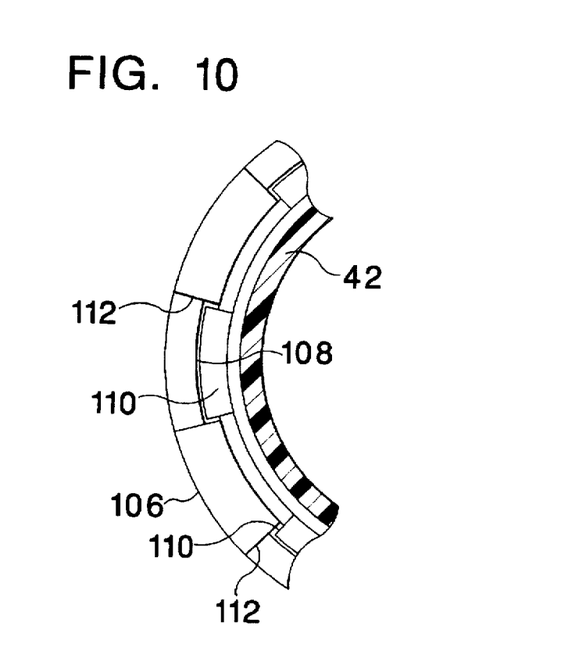
FIG. 10 is a fragmentary sectional view taken on line 10—10 in FIG. 9.

The distal ends of the fingers, on their radially inwardly facing portions, referenced as movable abutments 102, which engage fixed abutments 104 at the distal end of the inlet coupler housing 40. The fixed abutments 104 are angularly spaced apart a distance at least somewhat greater than the width of the fingers 100 (FIG. 9). This permits the fingers 100 to be aligned with the spaces between the fixed abutments as the couplers are being telescoped into assembled relation. When the couplers are properly telescoped to a fully assembled relation, the movable abutments 102 are axially inward of the fixed abutments 104. The coupler 38 may then be rotated to position the fixed and movable abutments into longitudinal alignment, thereby releasably locking the couplers in assembled relation.

As in the referenced prior U.S. Pat. No. 5,135,029 an interlock is provided to prevent inadvertent rotation of the couplers 36, 38 that would result in a nuisance separation of the couplers. The interlock comprises an interlock ring 106 which has slots 108 that receive angularly spaced lugs 110, projecting from the housing 42. The interlock ring 106 is thus locked, in an angular sense, with respect to the coupler housing 42. The lugs 110 project from the inlet coupler housing 42, in aligned relation with the fixed abutments 104. The interlock further comprises axial projections 112 that are aligned with the gaps between the fixed abutments 104. A wave spring 114 urges the interlock 106 toward the distal end of the coupler housing 42, to a position limited by engagement of the bottoms of the interlock slots 108 with the lugs 110. When the couplers are telescoped to a fully telescoped position, the interlock is yieldingly displaced away from the distal end of the housing 42, as the fingers 100 abut the projections 112. When the couplers are rotated to engage the movable abutments 102 with the fixed abutments 104, the locking ring is displaced by wave spring 114 to trap the fingers 100 between the projections 112.

When the couplers 36, 38 are releasably connected in this fashion, separation of the couplers requires that the fingers 100 be outwardly flexed (in a radial sense). At this point it will be noted that the base ends of the fingers 100 are secured to the outlet housing 66 by a locking collar 115 in a manner later described. The full lengths of the fingers, outwardly of the collar, to their distal ends, are free to flex outwardly to bring the movable abutments 102 to a release position, outwardly of the respective fixed abutments 104.

The force for outwardly flexing the fingers is generated by a camming action between the fixed abutments 104 and the movable abutments 102, which they, respectively, engage. It will be noted that the engaging surfaces are angled so that, when there is an axial separation force on the couplers 36, 38, a radially outward force is generated to deflect the fingers 100 outwardly. It is to be noted that the engaging surfaces of the fixed and movable abutments are at a relatively high angle, so that the outward force is less than the axial separation force. This reduces the strength of the force that must be provided to prevent outward displacement of the fingers to a release position until a predetermined axial loading has been reached.

Reliability in displacing to fingers 100 to release positions in response to a predetermined axial loading is achieved by employing garter springs 116 to provide the major force resisting outward deflection of the fingers 100. The balance of the force resisting outward deflection of the fingers 100 is the force required to bend the fingers to their release positions.

The springs 116 are positioned on the free ends of the fingers 100 by grooves 118 circumferentially of the abutments. Preferably, the grooves 118 position the springs 116 longitudinally on opposite sides of the surfaces of engagement between the fixed abutments 104 and the movable abutments 102.

The use of resilient springs, formed of high carbon, spring steel, or other highly resilient material, to provide the major portion of the force resisting flexing of the fingers, enables a more accurate control over the axial force at which couplers separate. Among other things, the reliance on the force of steel garter springs eliminates, for the most part, the variable resilience/strength of plastics, which can result from fatigue or other factors.

Figure 11:
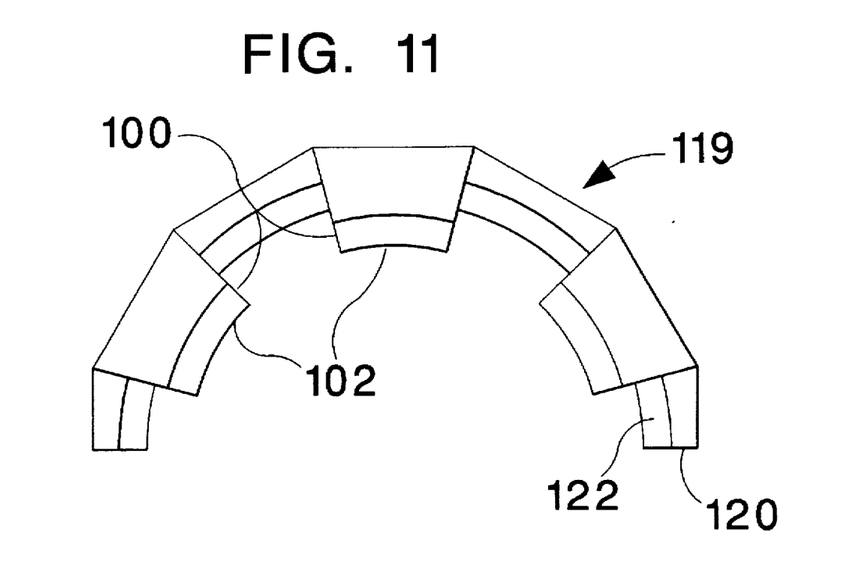
FIG. 11 is an end view of a "finger set" component employed in the coupling.
Figure 12:
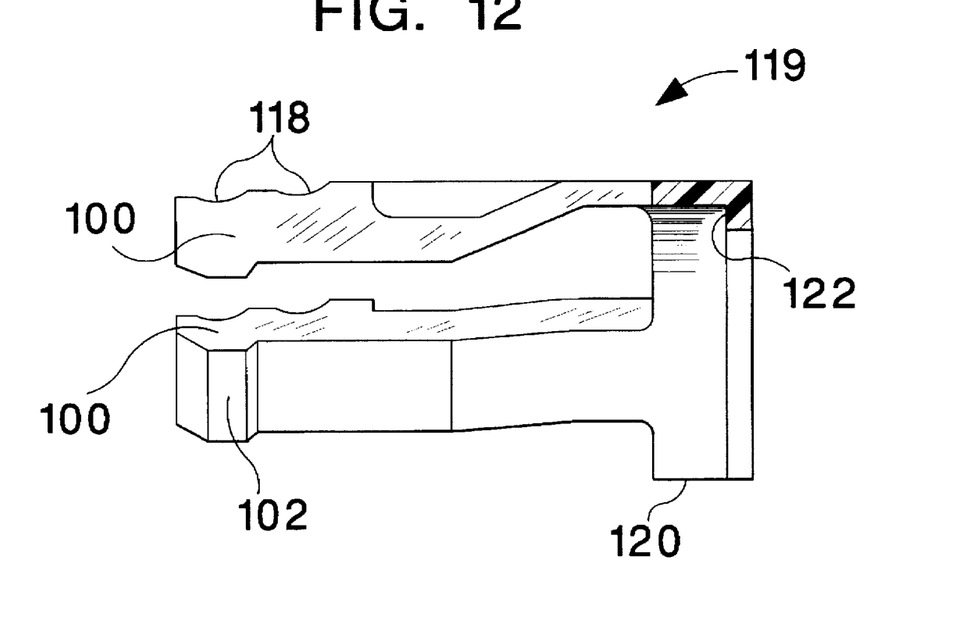
FIG. 12 is an elevation of the "finger set" seen in FIG. 11.

It is a feature of the invention that locking fingers 100 are provided by two finger sets 119. Each finger set 119 comprises three fingers 100 projecting from a semi-circular base 120. The two sets 119, which may be identical, when mounted on the outlet coupler housing 66, provide six, equi-angularly spaced fingers 100. The sets 119 are mounted on the coupler housing 66 in such a fashion that the couplers may be telescoped to an assembled relation and rotated to be locked against inadvertent separation, as previously described.

It is to be first noted that assembly and rotation of the couplers is facilitated by the inlet coupler housing 40 and the outlet coupler housing 66 having outer surfaces of a generally dodecagonal (non-circular) outline. Each finger set 119 is provided with a flange 122 that projects radially inwardly from the semi-circular base 120. The coupler housing 66 has a circumferential groove 121 that receives the flanges 122. The portion of the coupler 68, toward the mating end of the coupler, is turned, or otherwise provided with a cylindrical surface 124. Between the surface 124 and the distal end portion 82 of the housing 66, there is an intermediate, cylindrical, positioning surface 126.

Figure 5:
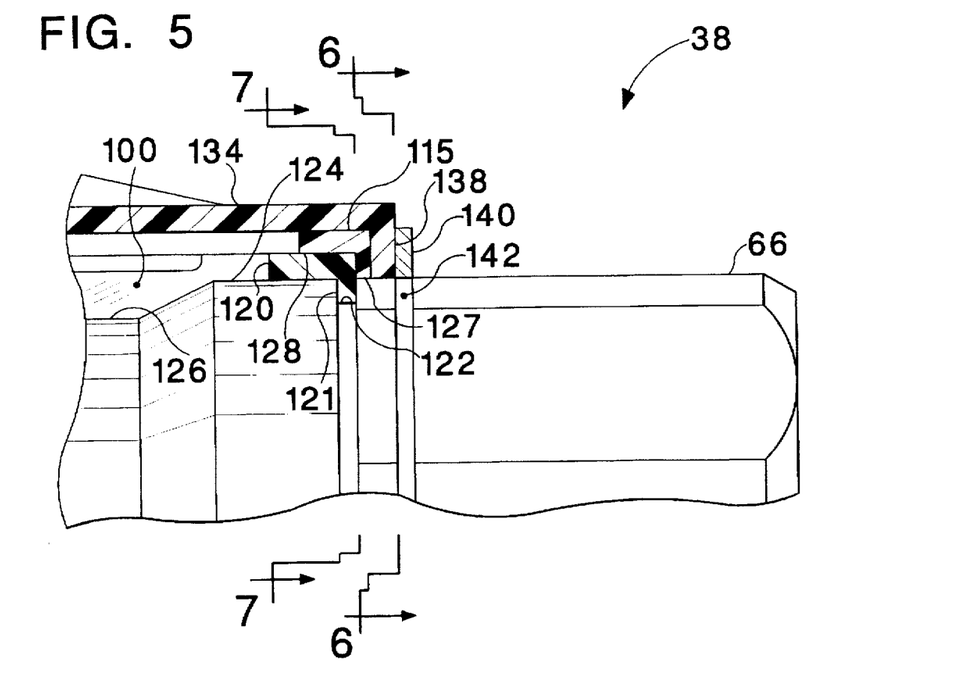
FIG. 5 is a longitudinal section, on an enlarged scale, further illustrating the mounting of locking fingers on the outlet coupler.
Figure 6:
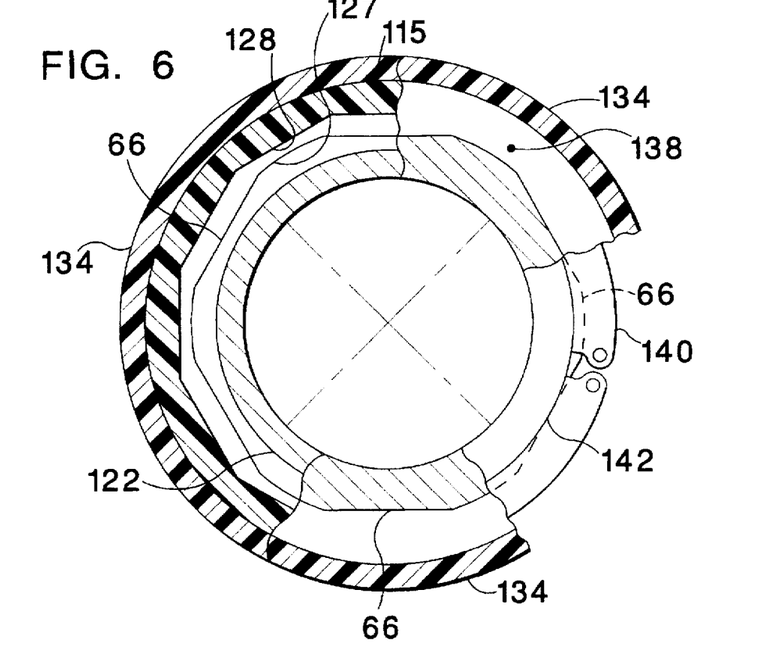
FIG. 6 is a section, on an enlarged scale, taken generally on line 6—6 in FIG. 5.
Figure 7:
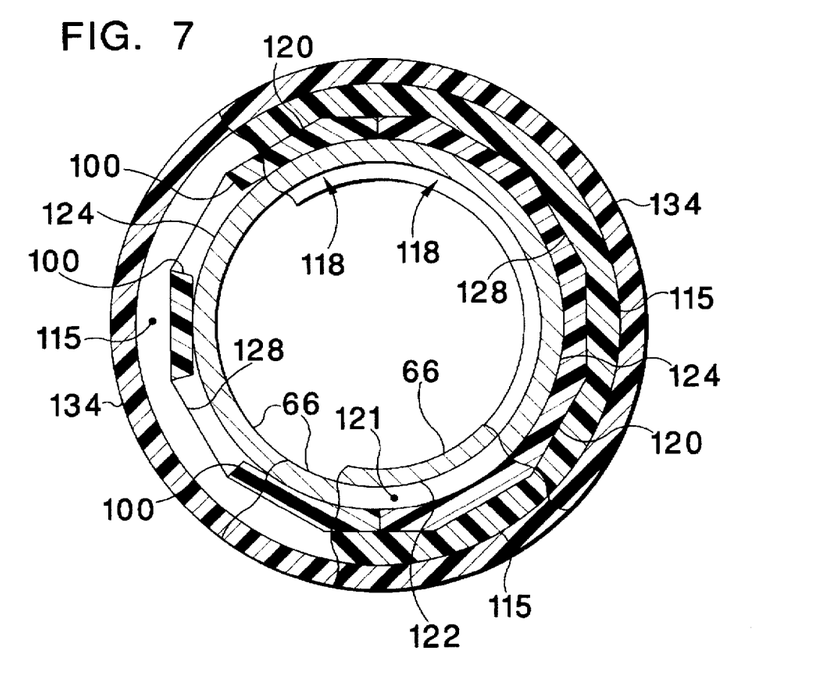
FIG. 7 is a section, on an enlarged scale, taken generally on line 7—7 in FIG. 5.
Figure 8:
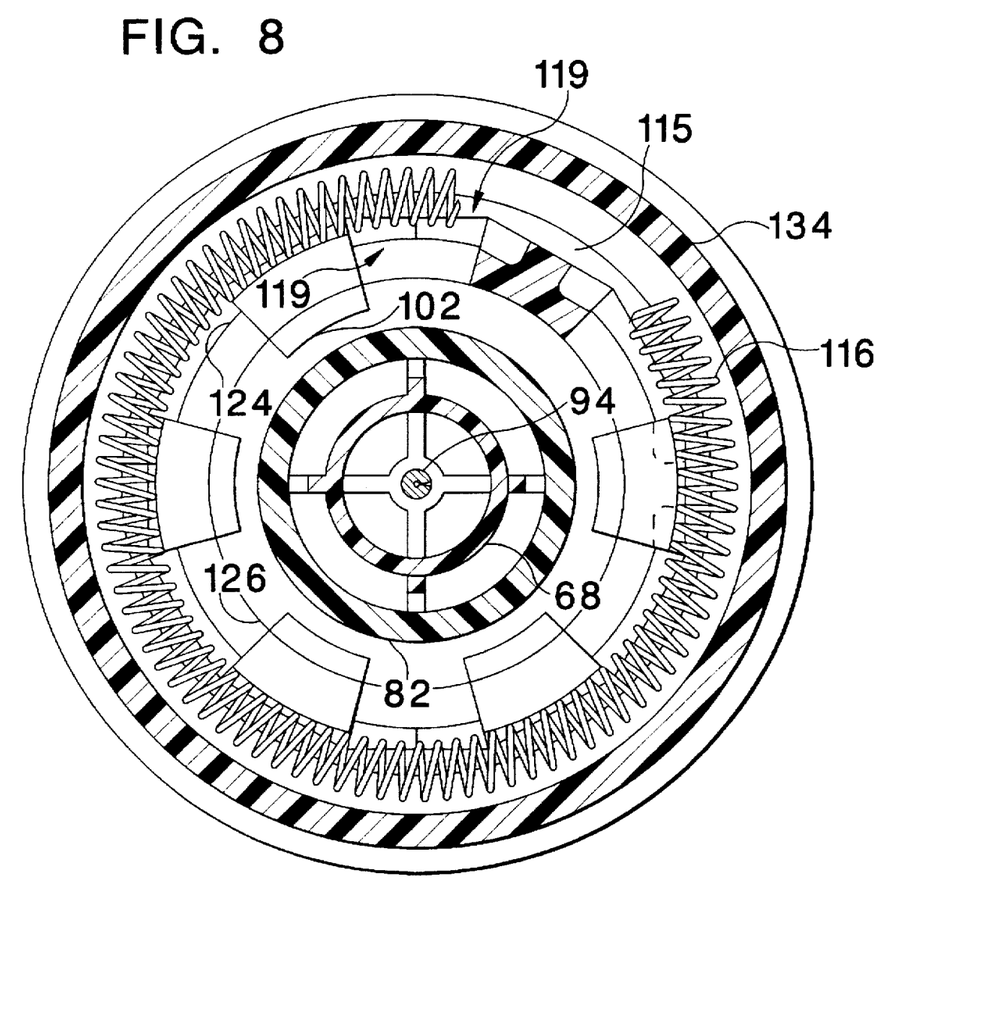
FIG. 8 is a section, on an enlarged scale, taken generally on line 8—8 in FIG. 3.

The inner surface of the semicircular bases 120 are, preferably, formed on a radius corresponding to the diameter of the cylindrical surface 124. The outer surface of each base 120 is formed with an outline that comprises half of a dodecagon. It is to be noted that the term "semi-circular" is used to denote half of a ring like band—taking into account that the outer surface of the base is non circular, i.e., it is not defined by a radius. The finger sets 119 are mounted on the outlet coupler housing 66 by introducing the flanges 122, laterally, into the groove 121 to position the fingers 100 in overlying relation to the mating portion 82. The locking collar 115 is then mounted to lock the finger sets 119 on the coupler housing 66. It will be noted that the collar 115 has an opening 127 (FIGS. 5, 6 and 7) of a dodecagonal outline that general matches the outline of dodecagonal outline of the outer surface of the outlet coupler housing 66. Further, the collar 115 has a recess 128 that has a dodecagonal outline that matches the dodecagonal outline that is compositely formed by the outer surfaces of the bases of the finger sets 119, when they are mounted in the coupler housing 66. The collar 115, is telescoped over the outlet end of the coupler housing 66 and shifted to the finger sets 119. The collar is locked against rotation relative to the housing 66. The finger sets, as may be needed, are rotated relative to the housing 66 to bring their composite dodecagonal outline into registration with the dodecagonal outline of the collar recess 128. The collar 115 is then shifted to position the bases 120 of the finger sets 119 in the recess 128, to thereby lock the fingers in fixed angular relation to the coupler housing 66.

At this point it will be noted that a compositely formed outer cover 132 is provided to protect the releasable connection provided by the fingers 100. The outer cover comprises 132 comprises an outlet shell 134 mounted on the outlet housing 66 and an inlet shell 136 mounted on the inlet housing 40.

The outlet shell has an inwardly projecting flange 138. The flange 138 has a central opening with an outline corresponding to the dodecagonal outline of the outer surface of the coupler housing 66. After the finger sets 119 and the locking collar 115 are positioned, as above described, the outlet cover shell is telescoped to bring the flange 138 into abutting relation with the collar 115. The collar 115 and shell 134 are then axially locked by a snap ring 140 that is positioned in a groove 142 formed in the outer surface of the coupler housing 66.

To complete describing the outer cover 132, further reference is made to the inlet shell 136, which has an in turned flange 144 having a central opening that permits the shell to be telescoped over the inner coupling housing 40, after a snap ring 146 has been positioned in a groove 148. Finally a second snap ring 146 is positioned in the groove 148 to capture the flange 144 and thereby mount the shell 136 on the inlet coupler housing 40. An alternate mounting arrangement could be provided by forming the flange 144 with sufficient flexibility to permit its being snapped into a groove 148 of lesser width, thereby eliminating the need for the snap rings 146.

The distal portions of the shells 134, 136 are formed as telescopable, round, tubular sections. This then permits the couplers 36, 38 to be telescoped to interdigitate the fingers 100 with the fixed abutments and then rotated to a locking position.

A further feature with respect to the fingers 100 is found in the provision of the positioning surface 126. It is to be noted that the garter springs 116 exert a continuous force tending to deflect the fingers 100 inwardly. If the coupler 38 is in a dissembled condition for any length of time, it is possible for the plastic material of the fingers to take a permanent set so that the fingers gradually bend inwardly. By providing the position surface 126 closely adjacent the distal ends of the fingers, the effective force that would distort the fingers is minimized.

Also, it is to be noted that the surfaces of the outer ends of the moveable abutments 102 are beveled at 146. These beveled surfaces facilitate telescoping the fingers 100 over the mating portion of the mating end of the inlet housing 42, in assembling the couplers.

Variations from the described embodiment will occur to those skilled in the art within the spirit and scope of the present inventive concepts, as set forth in the following claims.

Having thus described the invention, what is claimed as novel and desired to be secured by Letters Patent of the United States:

1. A fuel hose breakaway unit adapted to be connected in series flow relation with a hose and a fuel dispensing nozzle to minimize, if not fully prevent, damage in the event a vehicle is driven away with the nozzle lodged in the vehicle's fuel tank or there is, otherwise, a connection between the hose and the driveaway vehicle, said breakaway unit comprising
an inlet coupler,
an outlet coupler, and
locking mechanism releasably connecting said couplers in assembled relation,
wherein the locking mechanism comprises
abutment surface portions disposed on one coupler
a plurality of fingers
mounted on the other coupler and having free ends that are releasably engageable with the abutment surface portions of the other coupler to releasably connect the couplers,
characterized in that
the fingers are formed as portions of two finger sets, and each finger set comprises
a semi-circular band and
a plurality of fingers integrally formed with and extending longitudinally from the semi-circular band, and
means, in spaced relation from said fingers, for locking said bands on said other member,
whereby the fingers may independently flex relative to said band and release from said abutment means.

2. A fuel hose breakaway unit as in claim 1,
wherein the couplers each comprise a housing and
the housings each have mating end portions which are telescoped into sealed relation when the couplers are assembled, and
the opposite ends of said coupler housings are adapted for connection with fuel hoses,
further characterized in that
said bands of the finger sets are secured on the housing of said one coupler intermediate its length and
the fingers project longitudinally to the mating end portion of that housing, and
the abutment surface portions are formed on the exterior surface of the housing of the other coupler.

3. A fuel hose breakaway unit as in claim 2
further characterized in that
the outer portion of said other coupler housing, from the finger sets to the hose end thereof, has a non-circular outline, and
a circumferential groove is formed in said one housing intermediate its length,
the finger sets are each provided with an inwardly projecting flange that is received by said groove, and wherein said means for locking includes
a locking collar telescoped over the bands of said finger sets to lock them onto said one housing.

4. A fuel hose breakaway unit as in claim 3
wherein the outer surfaces of the bands of the finger sets compositely define a non-circular outline,
the locking collar has
an opening of non-circular outline matching the outline of the non-circular surface of said one coupler housing and angularly locking the locking collar with respect to said housing,
a socket receiving the bands of said finger sets,
said socket having an outline corresponding to the non-circular outline of the bands of the finger sets to thereby angularly lock the finger sets with respect to the locking collar and said one housing.

5. A fuel hose breakaway unit as in claim 4, wherein
one coupler is the outlet coupler and
said other coupler is the inlet coupler,
a garter spring surrounds the distal end of the fingers and provides the major portion of a force resisting flexing of the fingers to a release position, and
further characterized in that
each finger set consists of three fingers.

6. A fuel hose breakaway unit as in claim 5,
a compositely formed outer cover, mounted on the breakaway unit and protecting the locking mechanism,
said cover comprising a first shell mounted on the outlet coupler and a second shell mounted on the inlet coupler,
said shells having portions that are telescoped when the couplers are in assembled relations,
further characterized in that
the first coupler shell has an inward flange that is telescoped over the hose end of the outlet housing against the locking collar, and
a snap ring is mounted on the outer surface of the outlet coupler housing in fixed longitudinal relation and longitudinally, in combination with the inward flanges of the finger sets, locks the locking collar and the first coupler shell relative to the coupler housing.

7. A fuel hose breakaway unit as in claim 6 wherein
the inlet coupler housing has angularly spaced abutments on the outer surface of its mating end portion and the abutment surface portions are formed on said angularly spaced abutments,
and further characterized in that
the outlet coupler housing has an outer, positioning surface closely spaced, longitudinally from the distal ends of the fingers and engaged by the fingers to limit their inward deflection.

* * * * *